350-96.29 SR

XR 3,754,988

United States Patent

Barnes

[11] 3,754,988

[45] Aug. 28, 1973

[54] QUANTUM STATE MEMORY

[75] Inventor: Frank S. Barnes, Boulder, Colo.

[73] Assignee: Patent Technology International, Inc., New York, N.Y.

[22] Filed: Nov. 20, 1970

[21] Appl. No.: 91,440

Related U.S. Application Data

[62] Division of Ser. No. 692,425, Dec. 21, 1967, Pat. No. 3,567,371.

[52] U.S. Cl. .................. 117/212, 117/211, 156/180, 156/253, 340/173 LM, 340/173 LS, 350/96, 350/160 P

[51] Int. Cl. ..... B44d 1/18, B32b 31/00, G02b 5/14

[58] Field of Search ........................... 117/212, 211; 340/173 LM, 173 LS; 350/160 P, 96; 156/306, 296, 253, 180, 163

[56] References Cited

UNITED STATES PATENTS

| | | | |
|---|---|---|---|
| 2,905,830 | 9/1959 | Kazan | 340/173 LS |
| 3,360,657 | 12/1967 | Shlesinger, Jr. | 340/173 LM |
| 3,236,710 | 2/1966 | Curtiss | 156/168 X |
| 3,425,884 | 2/1969 | Brinkema | 156/296 X |

*Primary Examiner*—Alfred L. Leavitt
*Assistant Examiner*—Kenneth P. Glynn
*Attorney*—Fleit, Gipple & Jacobson

[57] ABSTRACT

A quantum state memory is described made up of a matrix suitable for conducting electromagnetic radiation along the paths of the matrix to the intersecting points. A suitable material is located at the intersecting points characterized by two quantum states which may be generated by atoms, molecules, or ions in liquids, solids, or gases. The switching between the quantum states is accomplished by subjecting the material at the intersecting points to electromagnetic radiation at two frequencies, in one case, and at a single frequency in the opposite case. Detection means are provided to determine the quantum state.

9 Claims, 6 Drawing Figures

3754988
NO OR CLASSIF

FIG. 1.
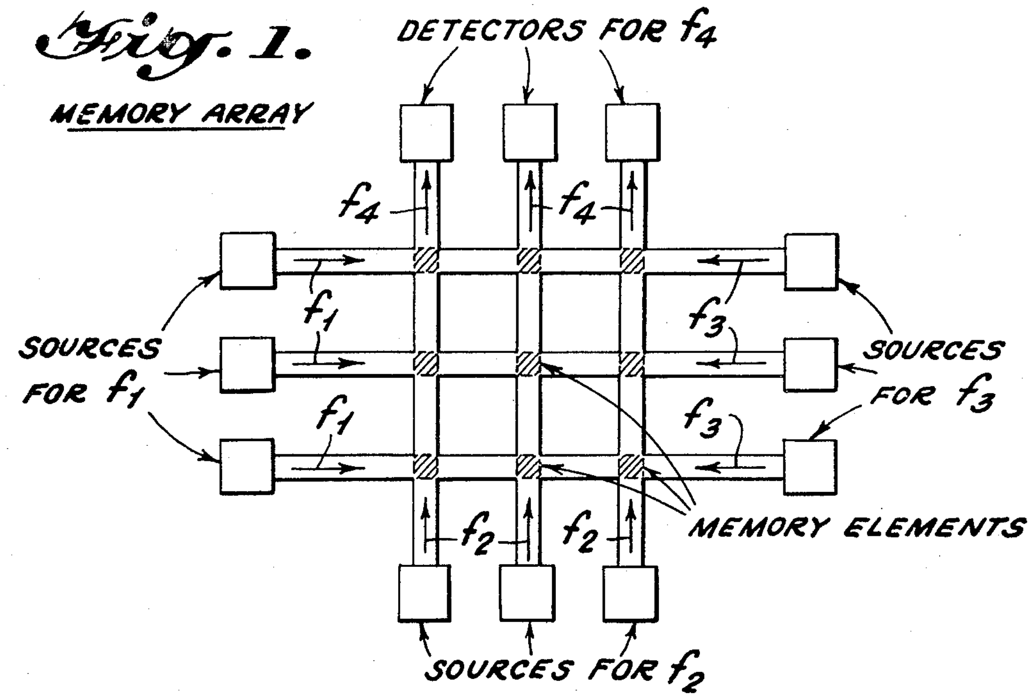
FIG. 2. DESIRED ENERGY LEVEL DIAGRAM FOR ADAPTOR DOPED ZnS
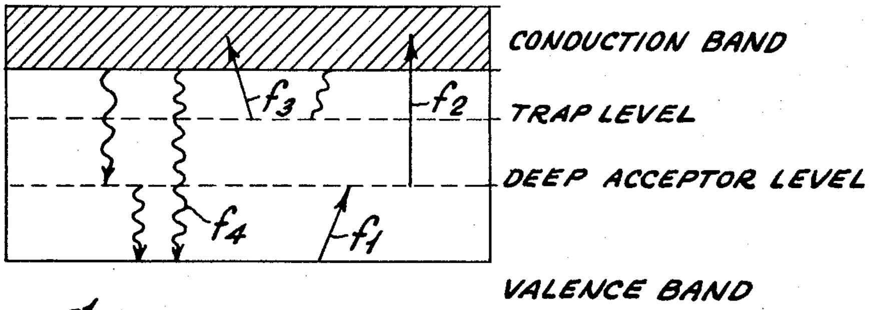
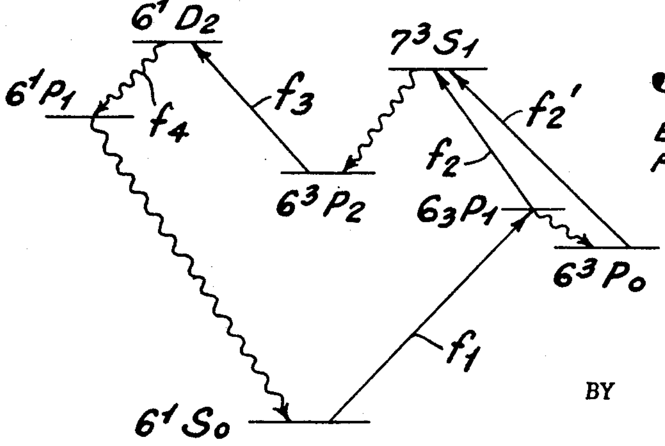
FIG. 3. ENERGY LEVELS FOR MERCURY VAPOR
INVENTOR
FRANK S. BARNES
BY FLEIT, GIPPLE & JACOBSON
ATTORNEYS

INVENTOR
FRANK S. BARNES
BY
FLEIT, GIPPLE & JACOBSON
ATTORNEYS

QUANTUM STATE MEMORY

CROSS-REFERENCE TO RELATED APPLICATION

This application is a division of Ser. No. 692,425, filed Dec. 21, 1967, not U.S. Pat. No. 3,567,371.

The present invention relates to memory elements which use quantum states for storing bits of information. The quantum states involved may be generated by atoms, molecules, or ions in liquids, solids, or gases. The energy levels between these quantum states may correspond to frequencies occuring over the entire electromagnetic frequency spectrum.

It is expected that the memory elements of this kind can be manufactured cheaply and will operate at very high speeds. In the optical region, it should be possible to activate these memory elements with pulses less than $10^{-12}$ seconds long. Applications for these memory elements are expected to be found in computers, and in data processing equipment. The technical problem solved by this memory element is the development of a very high speed low cost element which can be manufactured with batch processing techniques out of relatively cheap materials in large numbers.

Other and further objects of the invention will become apparent from the following detailed description of embodiments of the invention when taken in conjunction with the appended drawings i which: in FIG. 1 shows schematically an embodiment of a memory array developed according to the principles of the present invention;

FIG. 2 shows an energy level diagram for acceptor doped ZnS;

FIG. 3 shows schematically energy levels for mercury vapor;

Figure 4:
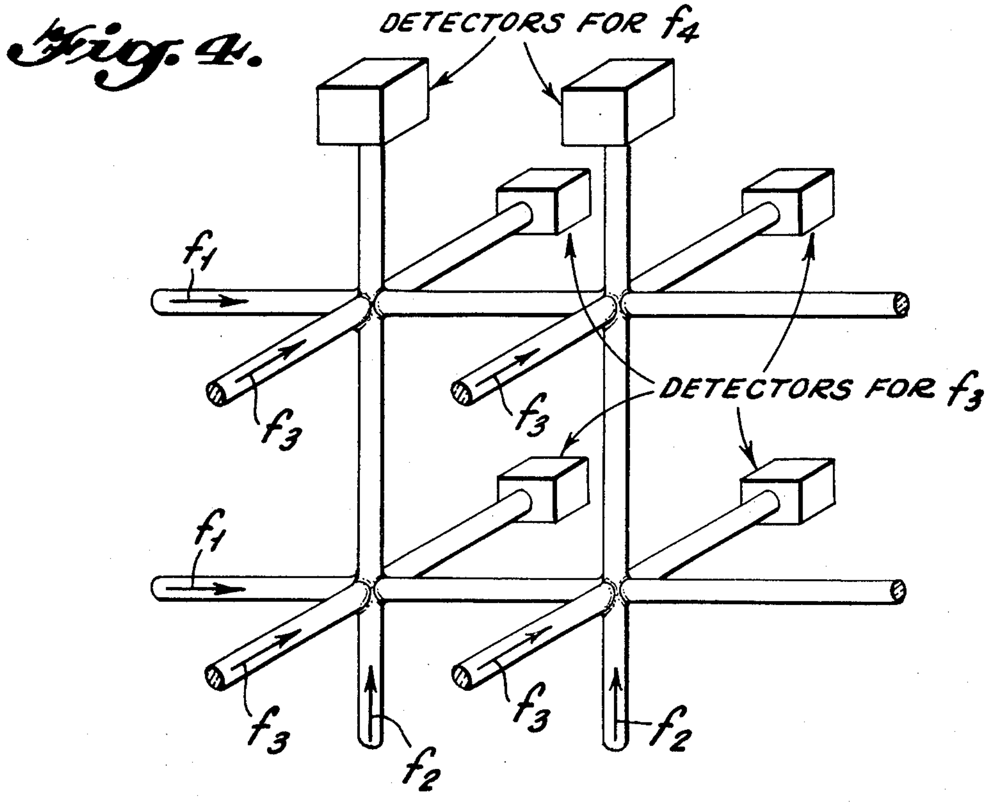
FIG. 4 shows schematically an alternate embodiment of a memory readout system developed according to the principles of the present invention.

The invention may be embodied in a variety of forms which provide a solution of the technical problem and which are based upon the principles of using quantum states as a memory element. These will be described in sequence with the most preferred scheme being discussed first.

A matrix of optical fibers or channels is laid out as shown in FIG. 1. The memory material is placed at the intersection of the glass fibers. This material may be a gas such as mercury vapor or a solid such as zinc sulfide which is doped to have the energy level diagram as shown in FIG. 2 (but is not limited to these materials). The zinc sulfide device works as follows: To set the memory element in state 1, a coincidence of light pulses at frequencies $f_1$ and $f_2$ is required in a period of time less than the lifetime of the acceptor level. The filling of the trap level with an electron will be used to define the one state of the optical memory element. The zero state is defined to be the valence band. The light at frequency $f_1$ raises an electron from the valence band to the deep acceptor level. The light at $f_2$ will raise it from the acceptor level to the conduction band where it rapidly decays spontaneously to the trap level where it is stored. The memory can be interrogated by a light pulse of $f_3$ which gives a readout signal at $f_4$ if the memory is in the trap state, and no signal at $f_4$ if it is in the valence band. The output signal, frequency $f_4$, can be recorded in a variety of ways, including placing a photoelectric detector with a filter to eliminate all other frequencies in a position shown on the diagram in FIG. 1. An interrogating pulse of frequency $f_3$ then reads out an entire row of memory elements as it propagates along the row into the detectors located as indicated on FIG. 1. The frequency $f_3$ lifts the electron from the trap level into the conduction band where it decays from the conduction band to the ground state in either one or two steps. The operation of this memory system, from a terminal point of view, is functionally similar to that used in core memory systems with destructive readout.

A second scheme for realizing a memory element of this kind is to replace the zinc sulfide element with mercury vapor. A partial energy level diagram is shown in FIG. 3. This device works in the same way as the zinc sulfide device, but the long-life state is the $6^3P_2$ state which has a lifetime of only about $10^{-3}$ or $10^{-4}$ seconds. Thus, this memory element will have to be read and reset approximately every $10^{-4}$ seconds or about every 10 to 100 cycles of computer operation. In this scheme, the frequency $f_1$ excites the atom to the $6^3P_1$ state where it may be directly excited to the $7^3S_1$ state by a $f_2$, or transferred by means of collision to the $6^3P_0$ state. From the $6^3P_0$ state, it can be excited to the $7^3S_1$ state by a frequency $f_2'$. A fraction of the electrons in the $7^3S_1$ state decay directly to the $6^3P_2$ state where they may be stored for the life of the memory element. The memory element is read out with a transition to a $6^1D_2$ state where a spontaneous decay provides the frequency $f_4$. For both these schemes, a terminal state for $f_1$ must have a lifetime which is short compared to the memory cycle time. The memory state used to store the one digit must have decay time much longer than a cycle time.

Other semiconductor materials, including CdS, zinc oxide, CSi, InAs, Si, Ge, GaAs, C, and the rare earth oxides and sulfides, may also be useful if they can be doped to have energy level diagrams similar to those shown in FIGS. 2 or 3. Acceptor levels in zinc sulfide may be generated by doping with As, Sb, P, N, and Bi. Alternate schemes are possible for the readout of the memory of this kind. They include, first, a detection of $f_4$ previously described with a photo diode such as one made from silicon or germanium in the geometry shown in FIG. 1. Alternately, the absorption of $f_3$ or emission at $f_4$ may be measured in a third fiber as shown in FIG. 4.

Figure 5:
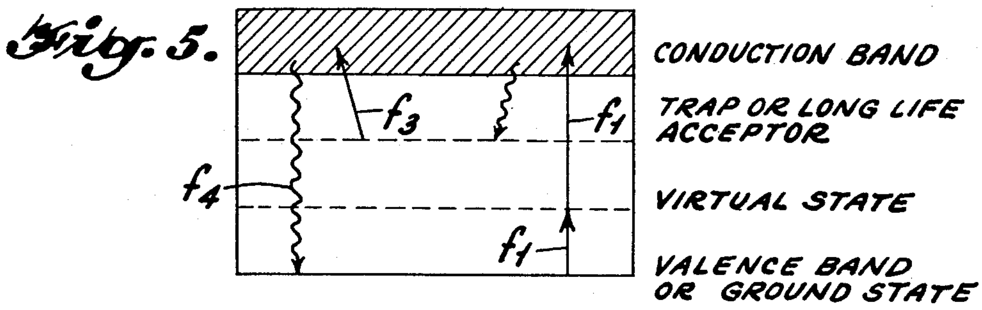
FIG. 5 shows schematically a two-quantum memory.

Variations in the method of placing an electron in a desired trap or memory state include the use of a two-quantum transition involving a virtual state as shown in FIG. 5. In this system, a coincidence of beams at $f_1$ is required in order to get sufficient energy density so that the transition probability to the conduction band is large enough to set a useful number of electrons in the desired trap state for registration of 1. A disadvantage of this two-quantum scheme for getting to the trap by means of a virtual state is the very high power density that is usually required for its operation. This method depends upon the non-linearities of the transition probabilities which go as the square of the electric field.

Figure 6:
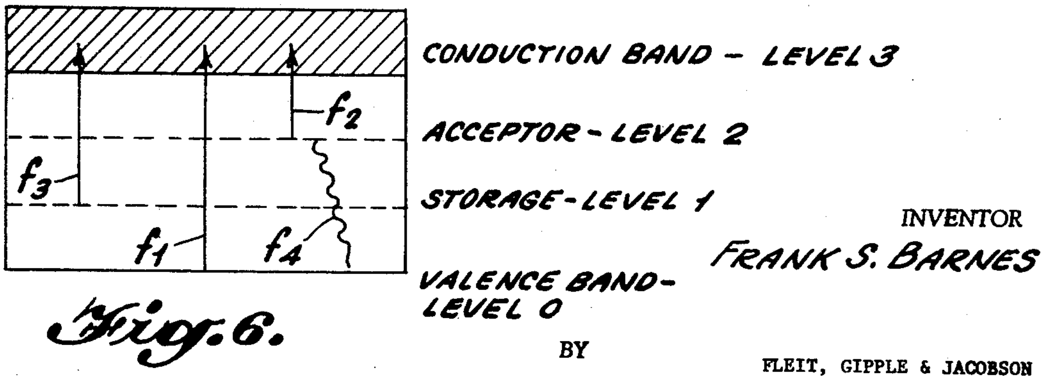
FIG. 6 shows schematically an alternate memory using blocking.

Another variation of the memory element uses a scheme in which the decay rates from the conduction band are different to the two acceptor states in the forbidden zone of a semiconducting material as shown in FIG. 6. In this scheme, radiation at frequency $f_1$ pumps electrons into the conduction band from which they decay to either level 2 or level 1. The long life state, for example level 1, is filled more slowly than level 2 which decays faster. In this case, radiation at the frequency $f_2$ blocks the flow of electrons into level 2. This allows electrons to fill level 1 setting the memory in state 1. The interrogation pulse of $f_3$ raises electrons from level 1 to the conduction band where they decay by way of transitions at $f_2$ and $f_4$. The transitions at $f_4$ can be detected as previously indi-cated. This scheme is, in some sense, the compliment of the first scheme described and thus widens the class of materials which may make useful memory elements. However, it also requires a pump signal $f_1$ at a larger frequency than the first scheme. For some materials, this will fall in the ultraviolet.

The most desirable light sources at the present time for driving the optical version of these memory elements appear to be gallium arsenide or gallium arsenide phosphoride laser diodes which are operated in a mode locked configuration. These light sources generate extremely intense and extremely short pulses of light over a wide range of the lower optical and near infrared spectrum. Small arc lamps with short time constants will also prove to be useful. In the microwave region, klystron, Gunn diodes, and other microwave sources could be used to drive materials which satisfy the same energy level criteria previously described. These levels may be found in the parametric states of chromium in ruby.

There are a number of techniques for constructing memory elements of this kind. These include the generation of a matrix of optical fibers which are fused at the intersection and then have a pin hole photoetched in the intersection so that the active material, such as mercury vapor, zinc sulfide, etc., can be placed in the pin hole. This glass fiber matrix has the advantage of conceptual simplicity with practical difficulties in manufacturing because of the fragile nature of the materials. An alternate manufacturing technique includes the use of thin films on a glass of ceramic substrate. In this case, a low index of refraction substrate provides the mechanical strength for the structure, and a high index of refraction material, such as $TiO_2$, is plated on one surface. This thin film can be made by the deposit of Ti followed by oxidation. The intersecting optical fiber matrix is then generated by photoetching the areas between the screen fibers. The etching should also leave a hole at the intersection of two fibers which is then filled with the active memory material. Techniques for depositing this material include vapor phase crystal growth, and vacuum disposition through a mask. The substrate and the optical matrix are then covered with another film of low index of refraction material, such as $SiO_2$, so that the high index of refraction fibers form optical wave guides. An isolating sheet of absorbant material is then deposited on top of the low index refraction material. The process can be repeated, and a very large number of isolated memory elements can be generated in an extremely small volume. In this way, full three-dimeinsional memory arrays are obtainable. In addition to glass, quartz, etc., it is quite possible that the materials, such as germanium and silicon, may form convenient substrates or dielectric materials, particularly for the devices to operate in th infrared region of the spectrum. In some cases, the laser driving diodes and the photo detectors can be formed directly on the memory substrate with the memory elements by using additional steps of conventional semiconductor and thin film technology.

Although the invention has been shown and described with reference to specific embodiments, various changes and modifications will be evident to those skilled in the art. Such changes and modifications which do not depart from the spirit, scope, and contemplation of the invention are deemed to come within its purview.

What is claimed is:

1. A process of making a quantum state memory comprising the steps of depositing a film of a material upon a substrate, removing portions of said film to define a matrix structure, placing at the intersecting points of the matrix in a position to intercept electromagnetic radiation being conducted therethrough a material characterized by two quantum states at different energy levels, said material being sensitive on exposure to preselected electromagnetic radiation to be driven from one of said quantum states to the other and said film of material being conductive of the electromagnetic radiation necessary to drive said material and to detect the quantum state of said material.

2. The process of claim 1 wherein holes are formed in the film at the intersecting points to receive said material place thereat.

3. The process of claim 1 wherein an isolating layer is placed over the matrix, and then a second thin film is deposited on the isolating layer and the process repeated to form a second matrix.

4. The process of claim 3 wherein the steps are successively repeated to build up a three-dimensional array containing a plurality of isolated matrices.

5. The process of claim 1 wherein source and detecting elements are formed in situ on the substrate integral with the matrix.

6. The process of claim 1 wherein the substrate is selected from the class consisting of glass and ceramic, titanium is desposited on the substrate as a thin film and is subsequently oxidized to form titanium dioxide, the portions of the film are removed by photoetching techniques to develop the matrix, and holes are etched at the intersections of the matrix.

7. The process of claim 6 wherein the titanium is deposited on the substrate by vapor phase crystal growth.

8. The process of claim 6 wherein the titanium is vacuum deposited through a mask to form the matrix without photoecthing to remove portions of the deposited film.

9. A process of making a quantum state memory comprising arranging two bundles of optical fibers in a grid pattern, fusing the fibers at their intersecting points, forming a hole at the intersecting points of said fibers, and locating in said hole in a position to intercept electromagnetic radiation being conducted by said fibers a material characterized by two quantum states at different energy levels, said material being sensitive on exposure to preselected electromagnetic radiation to be driven from one of said quantum states to the other.

* * * * *